J. G. CALLAN.
SHAFT BEARING.
APPLICATION FILED APR. 29, 1905.

974,119.

Patented Nov. 1, 1910.

Witnesses:

Inventor,
John G. Callan,
By Albert H. Davis
Att'y.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

SHAFT-BEARING.

974,119.  Specification of Letters Patent.  Patented Nov. 1, 1910.

Application filed April 29, 1905. Serial No. 258,042.

*To all whom it may concern:*

Be it known that I, JOHN G. CALLAN, a citizen of the United States, residing at Lynn, county of Essex, and State of Massachusetts, have invented certain new and useful Improvements in Shaft-Bearings, of which the following is a specification.

This invention relates to journal bearings for shafts, and especially the shafts of steam turbines, dynamo-electrical machinery, and other machines designed to be run at high speeds. Such bearings generally comprise a tubular lining of bronze or the like, made in two parts, and extending the full length of the journal. The linings are of considerable thickness in order to have sufficient stiffness to afford a proper support for the shaft. Each lining is supported in a pillow block, generally of cast iron, which is fitted to an enlarged or thickened portion of the lining at about the middle thereof. Now when such a structure becomes heated by rapid running of the shaft, or otherwise, the bronze and the cast iron expand unequally, and inasmuch as the coefficient of expansion of the bronze is greater than that of the cast iron, there results an increase of pressure or tightness at the joint where the lining passes through the pillow block. Since the pillow block is heavier and stiffer than the lining, the latter cannot expand outwardly, and the result is that its internal bore becomes contracted. This effect is the more marked if the lining is a split one, and in either case it either actually grips the shaft or causes the effective wearing surface to be altered in accordance with the distortion of the internal shape of the lining. The object of my invention is to obviate this difficulty, which is accomplished by cutting away the thickened middle portion of the lining where it comes in contact with the pillow block so as to provide comparatively thin flanges concentric with the shaft, and having their outer surfaces in contact with the pillow block. Any expansion of the lining is compensated for by the slight inward bending of these flanges instead of by a reduction of the internal diameter of the lining.

Figure 1:
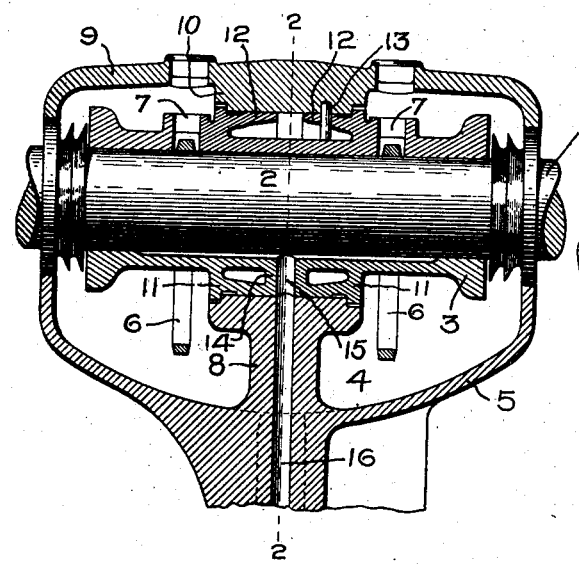
Figure 2:
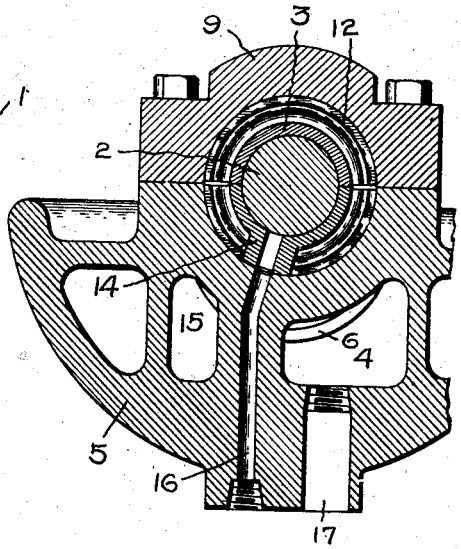
Figure 3:
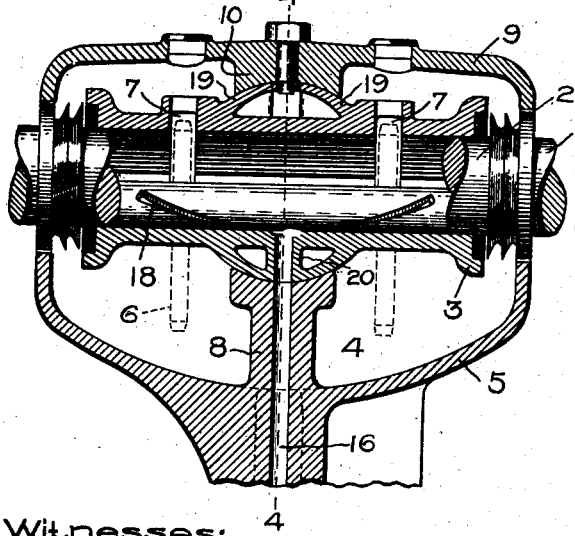
Figure 4:
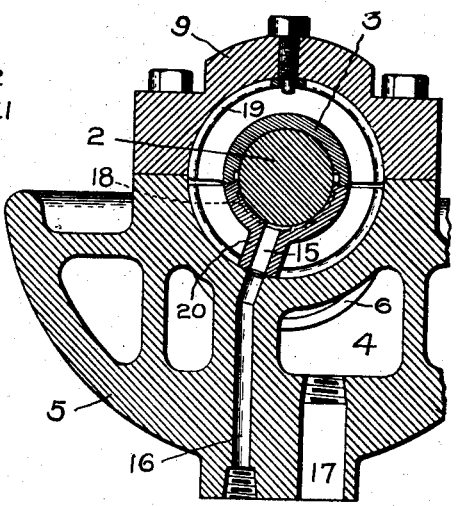

In the accompanying drawing, Figure 1 is a longitudinal section of a shaft bearing embodying my invention. Fig. 2 is a cross section of the same on the line 2—2, Fig. 1. Fig. 3 is a longitudinal section of a shaft bearing having a spherical joint between the lining and the pillow block. Fig. 4 is a cross section of the same on the line 4—4, Fig. 3.

Referring first to Figs. 1 and 2, the shaft 1 is shown as provided with a journal 2 received in a lining 3 of bronze or the like, which is inclosed in a chamber 4 in the pillow block 5. The chamber forms an oil well, and the journal may be lubricated by rings 6 hanging loosely on the journal and dipping into the oil; slots 7 being made in the lining to permit them to revolve freely. The lining is supported at its middle in a seat formed in a heavy web 8 integral with the pillow block. The cap 9 of the block has a central boss 10 corresponding with this web and forming the uper half of the cylindrical seat. The lining 3 is made in two parts, the lower received in the seat in the web 8 and the upper in the boss on the cap. At or near each end of the seat, the lining has a stiffening rib 11 running around it, which may, if desired, be rabbeted into the edge of the seat, as shown. The inner surface or wall of the rib is preferably located at least as far from the center of the seat as the edge of the supporting portion of the seat so that there will be no continuous body of metal between the shaft and said supporting portion. Such a body of metal would tend to cause distortion or binding of the lining when the parts were heated. From each rib there extends an overhanging flange 12, concentric with the shaft and having an outer surface fitted to the cylindrical seat in the web and boss. The adjacent ends of the flanges do not quite touch each other, as shown, and a certain space is left between the flanges and the body of the lining. A dowel pin 13 may be used to prevent the lining from rotating in the seat. In the lower half of the lining is a boss or column 14 connecting the flanges with the body of the lining, and through this column is formed an oil passage 15 communicating with a duct 16 in the pillow block. Through this duct and passage, cold oil is constantly fed to the lining, the surplus being led off through a drain 17. When this bearing becomes heated, the flanges, extending as they do parallel with the shaft, yield somewhat in a radial direction, so that the body of the lining can expand outwardly and thus avoid pinching the shaft. The column 14 does not defeat this operation, for the reason that the cold oil passing through it keeps down its temperature, so that no injurious expansion can take place at this point, in spite of the fact that the column is radially disposed. The ribs 11 assist in reducing the expansive effect, since they conduct a certain amount of heat from the lining to the pillow block.

In Fig. 3, the journal is nearly all broken away, to show the helical oil groove 18 in the inner surface of the lower half of the lining. It also shows the slots 7 in which the lubricating rings run. The lining has a spherical enlargement at its middle, so that it is self adjusting in the spherical seat in the pillow block. This spherical enlargement is cut out to form the flanges 19 extending in from the outer ends of the central body portion of the lining, and having spherical outer surfaces. In the lower half of the lining is a column 20 for the oil passage, just as in the structure shown in Fig. 1. The oil passage communicates with the groove 18. In addition to the relieving of the expansion by the yielding of the flanges when the bearing gets hot, the flanges also have a slight elastic or spring action which tends to deaden the shocks or vibration communicated from the shaft to the lining, and this assists in producing an easier-running bearing.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a journal bearing, the combination with a pillow block, of a lining provided with flanges supported in said pillow block, said flanges extending toward the center of the supporting portion of the pillow block from each side thereof.

2. In a journal bearing, the combination with a pillow block having a seat, of a lining having flanges extending toward each other and fitting said seat.

3. In a journal bearing, the combination with a pillow block having a seat, of a lining having an enlarged middle portion provided with flanges extending toward each other and fitting said seat.

4. In a journal bearing, the combination with a pillow block having a seat, of a lining having an enlarged middle portion provided with flanges extending from the ends thereof toward the center and fitting said seat.

5. In a journal bearing, the combination with a pillow block having a seat, of a lining having spaced circumferential ribs, and an overhanging flange extending from each rib toward the center of the seat and having its outer surface fitted to said seat.

6. In a journal bearing, the combination with a pillow block having a cylindrical seat, of a lining having parallel stiffening ribs, and a flange extending from each rib and fitting said seat.

7. In a journal bearing, the combination with a pillow block having a cylindrical seat, of a lining having a stiffening rib adjacent each end of said seat, and flanges extending toward each other from said ribs and fitting said seat.

8. In a journal bearing the combination of a pillow-block having a seat, and a lining receiving the shaft, there being a plurality of oppositely disposed, spaced, annular flanges on the lining which overhang its body in a longitudinal direction and engage said seat.

9. In combination, a pillow block having a seat, and a lining forming a bearing for a shaft, said lining having a substantially rigid body portion provided with integral yielding members extending toward the center of said body portion from each side thereof, which members engage the seat and prevent an increase of tightness of the bearing due to unequal expansion of the lining and the pillow block when heated.

10. In a journal bearing, the combination with a pillow block having a seat, of a lining supported on said seat and having a body portion, parallel circumferential ribs on said body portion, the inner surfaces of the ribs being farther from the center of the seat than the edges of the supporting portion of said seat, and a flange extending from each of said surfaces toward the center of the seat which overhangs the body portion of the lining and has its outer surface in engagement with the seat.

11. In a journal bearing, the combination with a pillow block, of a lining provided with a plurality of yielding members supported in said pillow block, said members extending toward the center of the supporting portion of the pillow block from each side thereof.

In witness whereof, I have hereunto set my hand this twenty-sixth day of April, 1905.

JOHN G. CALLAN.

Witnesses:
 JOHN A. McMANUS, Jr.,
 HENRY O. WESTENDARP.